(12) United States Patent
Liu et al.

(10) Patent No.: US 11,014,061 B2
(45) Date of Patent: May 25, 2021

(54) CARBON ALLOTROPE COMPOSITE FIELD EFFECT ARTIFICIAL AURORA GENERATING DEVICE

(71) Applicants: Tielin Liu, Shenzhen (CN); Nanlin Liu, Shenzhen (CN)

(72) Inventors: Tielin Liu, Shenzhen (CN); Nanlin Liu, Shenzhen (CN); Honggang Wang, Shenzhen (CN); Lihan Liu, Shenzhen (CN)

(73) Assignees: Tielin Liu, Shenzhen (CN); Nanlin Liu, Shenzhen (CN)

( * ) Notice: Subject to any disclaimer, the term of this patent is extended or adjusted under 35 U.S.C. 154(b) by 0 days.

(21) Appl. No.: 16/979,180

(22) PCT Filed: Aug. 23, 2018

(86) PCT No.: PCT/CN2018/101854
§ 371 (c)(1),
(2) Date: Sep. 9, 2020

(87) PCT Pub. No.: WO2019/210620
PCT Pub. Date: Nov. 7, 2019

(65) Prior Publication Data
US 2020/0406223 A1    Dec. 31, 2020

(30) Foreign Application Priority Data
May 2, 2018    (CN) .......................... 201810461678.8

(51) Int. Cl.
*B01J 19/08*    (2006.01)
*G21K 5/02*    (2006.01)
*B01J 19/00*    (2006.01)

(52) U.S. Cl.
CPC ......... *B01J 19/087* (2013.01); *B01J 19/0053* (2013.01); *G21K 5/02* (2013.01);
(Continued)

(58) Field of Classification Search
None
See application file for complete search history.

(56) References Cited

FOREIGN PATENT DOCUMENTS

| CN | 101223567 A | 7/2008 |
|----|-------------|--------|
| CN | 105679159 A | 6/2016 |

(Continued)

OTHER PUBLICATIONS

Chinese Society of Environmental Sciences, Carbon nano-mineralization reduction environmental treatment technology, 2016, No. 58.

*Primary Examiner* — Kishor Mayekar
(74) *Attorney, Agent, or Firm* — Bayramoglu Law Offices LLC

(57) ABSTRACT

A carbon allotrope composite field effect artificial aurora generating device includes an extremely low frequency power supply cabinet, a carbon allotrope composite field effect device and a cuboid-shaped water tank. The carbon allotrope composite field effect device is formed by alternately and in parallel superimposing, in a form of parallel capacitors, a plurality of planar electrode plates made of a foamed nickel deposited with a carbon allotrope composite and a plurality of planar separators made of an insulating material. A first output wire of the extremely low frequency power supply cabinet is connected to odd-numbered planar electrode plates of the plurality of planar electrode plates through a first conductive rod, and a second output wire of the extremely low frequency power supply cabinet is connected to even-numbered planar electrode plates of the plurality of planar electrode plates through a second conductive rod.

1 Claim, 2 Drawing Sheets

(52) U.S. Cl.
CPC ............... *B01J 2219/0809* (2013.01); *B01J 2219/0815* (2013.01); *B01J 2219/0835* (2013.01)

(56) References Cited

FOREIGN PATENT DOCUMENTS

| | | |
|---|---|---|
| CN | 206039985 U | 3/2017 |
| JP | H02282780 A | 11/1990 |
| JP | H0636125 B2 | 5/1994 |
| JP | 2001175163 A | 6/2001 |

CARBON ALLOTROPE COMPOSITE FIELD EFFECT ARTIFICIAL AURORA GENERATING DEVICE

CROSS REFERENCE TO THE RELATED APPLICATIONS

This application is the national phase entry of International Application No. PCT/CN2018/101854, filed on Aug. 23, 2018, which is based upon and claims priority to Chinese Patent Application No. 201810461678.8, filed on May 2, 2018, the entire contents of which are incorporated herein by reference.

TECHNICAL FIELD

The present invention relates to the technical field of geophysics, and more particularly, to a carbon allotrope composite field effect artificial aurora generating device.

BACKGROUND

Aurora is a natural phenomenon of the earth, which is a result of the interaction of the cosmic high-energy charged particles, the earth's surface atmosphere and the earth's magnetic field. Generally, aurora borealis appears to show greenish glow when oxygen is excited (557 nM), while aurora australis typically presents in shades of purple when nitrogen is excited (428 nM). The gorgeous aurora illuminates the mysterious night sky above the south pole and the north pole, which has brought countless fantasy dreams and desires to mankind for thousands of years, hoping that human beings will be able, like wizards, to create, manipulate and make use of this great miracle of the universe.

Scientific research shows that the carbon allotrope composed of graphene, carbon nanotube, graphdiyne, fullerene and diamond has remarkable nano-material properties and exhibits excellent properties in electricity, optics, thermotics, mechanics and others. Using graphene as an example, electrons escaping from its surface require extremely low power. Very weak energy can trigger electron emissions, and electron or hole conduction therein may be performed at a speed more than a hundred times faster than any other material. This is almost close to the velocity of light. Different from other materials in which one photon produces one electron, with respect to graphene, one incident photon excites many electrons in graphene to produce a large number of electronic signals. Under the action of a low-frequency electric field in a low-energy state, some freely vibrating electrons on the surface of the graphene interact with photons to produce electron dense waves propagating along the surface, which can form electromagnetic surface waves of low-density plasma. Meanwhile, the electric field component of the light wave acts on the free electrons on the surface of the graphene. This can cause longitudinal wave oscillation of the free electrons along the light propagation direction, so as to produce the phenomena of surface plasmon resonance and coupled electromagnetic wave resonance. In addition, graphene can transfer electrons and nuclei like hydrogen and heavy hydrogen atoms by an effect known as quantum tunneling and cause vortex motion at the tip of a micro-region on its surface. This can, in turn, cause high-energy particles to reverse to produce a certain number of superluminal abnormal high-energy charged particles.

Schumann resonance demonstrates that the resonant frequency of an enormous cavity resonator formed by a closed-sphere earth-ionospheric cavity can enhance the radiation of extremely low frequency electromagnetic waves having a frequency of 0-300 Hz. In recent years, scientists have monitored global environmental changes by studying the Schumann resonance caused by natural phenomena such as lightning strikes, earthquakes, and tropical temperature changes.

By means of a method of normal-temperature, vacuum and high-frequency plasma chemical vapor deposition on diamond-like carbon film, taking a foamed nickel or a carbon fiber as a bias cathode substrate, a carbon allotrope composite with a thickness of about 200 nm can be obtained on the surface of the foamed nickel or the carbon fiber by controlling the chemical vapor deposition formation conditions. The resulting carbon allotrope composite having a thickness of about 200 nm is determined via the Analysis and Testing Center of Guangzhou Institute of Chemistry, Chinese Academy of Sciences by using the electron microscope and Raman spectroscopy. The foamed nickel deposited with the carbon allotrope composite is made into planar electrode plates, which are immersed in water in parallel and loaded with extremely low frequency electric field, so that the abnormal high-energy charged particles can be excited by Schumann resonance. In addition to the south pole and the north pole of the earth, the device can produce auroras phenomenon in other regions. Moreover, in the period of dawn or dusk when solar rays are parallel to the horizon, the video recording equipment can be used to record the columnar greenish aurora composed of oxygen ions and the columnar fuchsia aurora composed of nitrogen ions in real time. Artificial aurora is covered by strong sunlight during the day, and cannot be excited when there is no sunlight at night, so only in the period of dawn or dusk, that is, when solar rays are parallel to the horizon and the light intensity is weakest, the artificial aurora can be captured and recorded by high-resolution camera.

Usually, aurora occurs only at the earth's magnetic pole region because some of the charged particles from the solar wind are captured by the earth's magnetic field when approaching earth and fall toward the magnetic pole. Those charged particles collide with atoms of oxygen and nitrogen, knocking out electrons, and cause the atoms of oxygen and nitrogen to be excited ions and emit radiation with different wavelengths. The aurora borealis is mainly a greenish glow formed by oxygen ions, while the aurora australis is mainly a fuchsia glow formed by nitrogen ions. Therefore, the aurora is the product of the interaction of the earth's magnetic field, the cosmic high-energy charged particles and the atmosphere. By means of the aurora that is produced in the non-earth magnetic pole region and excited by the carbon allotrope composite field effect artificial aurora generating device, it is helpful to study and explore the formation and distribution characteristics of the non-dipole spatial magnetic poles in the earth's atmosphere magnetosphere, the origin of the earth's magnetic field, the effects of cosmic energy on the earth's climatic environment and other phenomena. In addition, the spatial energy of artificial aurora can be used to control climate change and environmental pollution and predict natural disasters.

Applicant has used the active oxygen atoms produced by the carbon allotrope composite field effect artificial aurora generating device to perform mineralization and reduction on the pollutants in the atmosphere, water and soil. So far, the treatment of dozens of polluted water bodies has been completed, and passed the expert technical appraisal in 2016 (Zhong Ke Huan Jian Zi No. [58]).

Detection of the concentration of active oxygen element in the atmosphere:

| Experimental site | Atmospheric background (ug/L) | 60-minute detection (ug/L) | Increased times of the concentration of activated oxygen element |
|---|---|---|---|
| Yu Garden, Shanghai City, China | — | 780 | 780 |
| Emerald Lake, Chongqing City, China | 150 | 320 | 2.1 |
| Oxidation Pond, Bayannaole City, Inner Mongolia Autonomous Region, China | 0 | 1130 | 1130 |

Detection of the concentration of active oxygen element in experimental water body:

| Experimental site | Water body background (mg/L) | 60-minute detection (mg/L) | Increased times of the concentration of activated oxygen element |
|---|---|---|---|
| Yaojiang, Ningbo City, China | 3 | 13 | 4.3 |
| West Lake, Yanqing City, China | 2 | 19.7 | 9.9 |

The active oxygen element in the experimental water body digests the organic matter in the water body (chemical oxygen demand (COD) value):

| Experimental site | Water body capacity ($m^3$) | COD value of water body background (mg/L) | Detection time (Day) | COD value of water body during the experiment (mg/L) | Reduced times of the COD value |
|---|---|---|---|---|---|
| Chaohu Lake, Anhui Province, China | $3.7 \times 10^9$ | 27.7 | 26 | 19.4 | 1.4 |
| North Lake, Baoding City, China | $3 \times 10^5$ | 172 | 0.42 | 7 | 24.6 |
| Tao ran Pavilion, Beijing City, China | $4 \times 10^5$ | 97.1 | 3 | 7.3 | 13.3 |

The above data are obtained by using a JXGT pump suction detector to detect the atomic oxygen content in the atmosphere and using the dichromate method to detect the COD value of the water body.

The above research results show that when the water body capacity of Chaohu Lake in China is $3.7 \times 10^9$ ($m^3$) and the COD value is reduced by 1.4 times, it is required to consume the huge energy of about $10^9$-$10^{10}$ W, which is equivalent to that of the output energy of the carbon allotrope composite field effect artificial aurora generating device, which is billions of times higher than the input energy thereof. By means of the high-energy charged particles that is produced by the carbon allotrope composite field effect artificial aurora generating device and has an energy close to or higher than the solar storm energy. The artificial auroras with the huge energy can be produced in the earth's atmosphere, which can activate oxygen and nitrogen elements in the atmosphere and increase the concentration of active oxygen element in the atmosphere by 2.1-1130 times. In addition, the concentration of active oxygen element in the experimental water body is increased by 4.4-9.9 times, and the chemical oxygen demand (COD) value is decreased by 1.4-24.6 times. Therefore, it is desirable to apply this artificial aurora acquisition method to control the pollution of the earth's atmosphere, water and soil, which is of epoch-making significance to solve the increasingly serious environmental pollution problems that human beings have to face and restore the natural ecology quickly.

SUMMARY

A carbon allotrope composite field effect artificial aurora generating device includes an extremely low frequency power supply cabinet, a carbon allotrope composite field effect device and a cuboid-shaped water tank. The carbon allotrope composite field effect device is formed by alternately and in parallel superimposing, in a form of parallel capacitors, a plurality of planar electrode plates made of a foamed nickel deposited with a carbon allotrope composite and a plurality of planar separators made of an insulating material. One output wire of the extremely low frequency power supply cabinet is connected to odd-numbered planar electrode plates made of the foamed nickel deposited with the carbon allotrope composite through a conductive rod, and the other output wire of the extremely low frequency power supply cabinet is connected to even-numbered planar electrode plates made of the foamed nickel deposited with the carbon allotrope composite through a conductive rod. The carbon allotrope composite field effect device is fixed in the cuboid-shaped water tank fully filled with water.

DETAILED DESCRIPTION OF THE EMBODIMENTS

Figure 1:
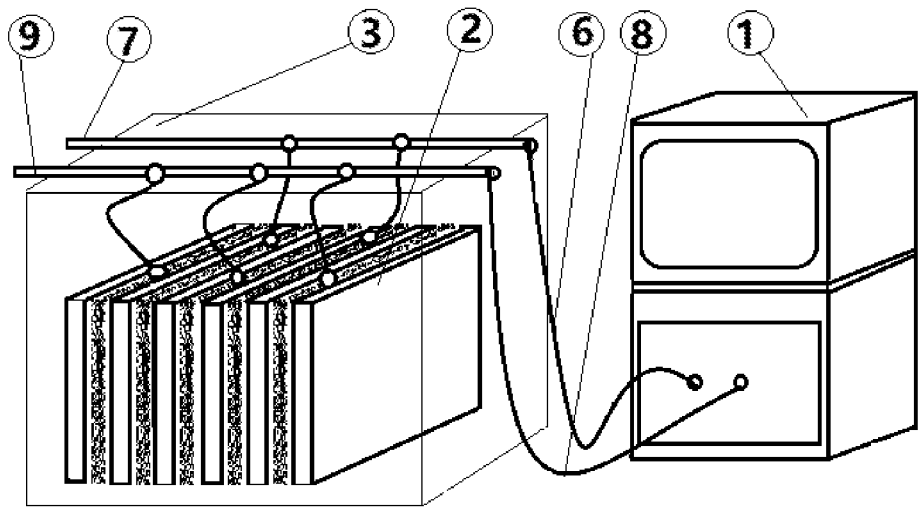
FIG. 1 is a schematic diagram showing the structure of a carbon allotrope composite field effect artificial aurora generating device.
Figure 2:
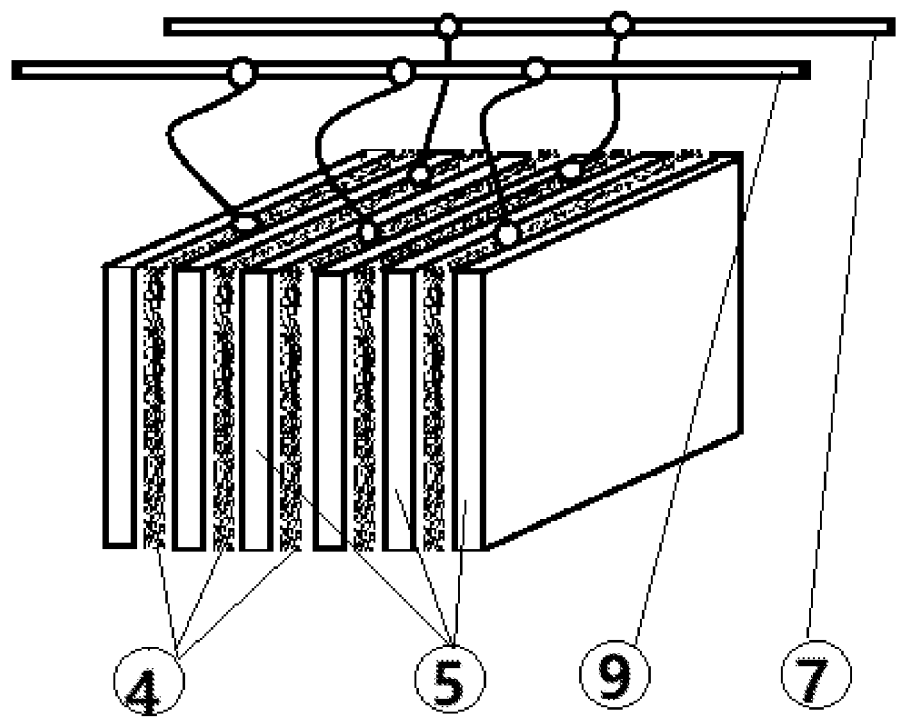
FIG. 2 is a schematic diagram showing the structure of the carbon allotrope composite field effect device.
Figure 3:
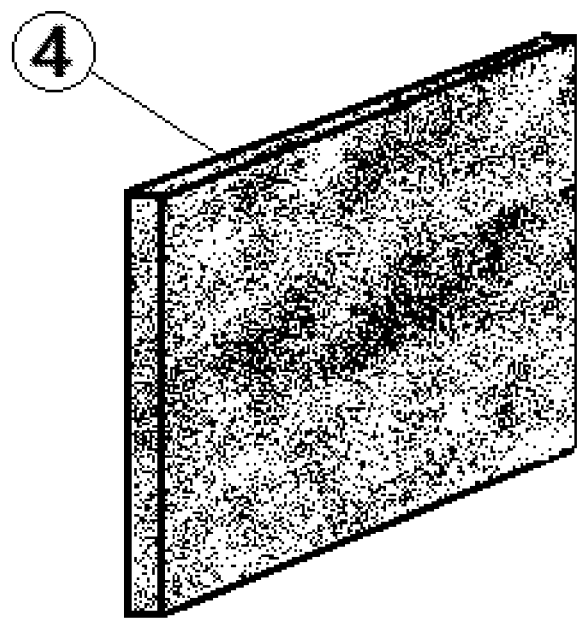
FIG. 3 is a schematic diagram showing the structure of the planar electrode plate made of a foamed nickel deposited with a carbon allotrope composite.
Figure 4:
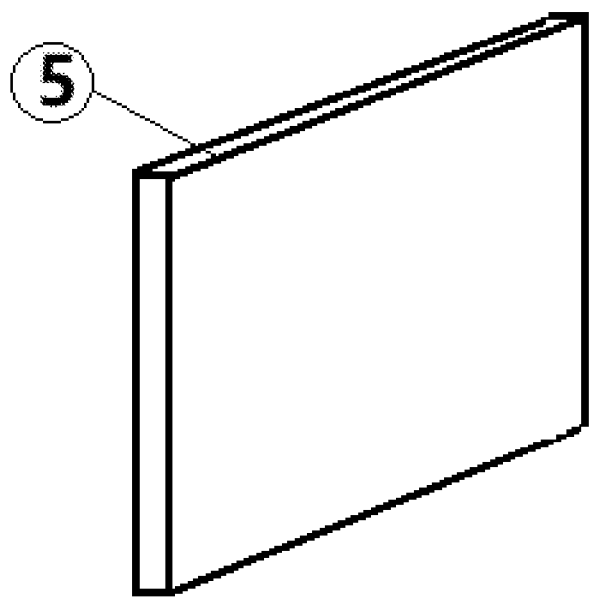
FIG. 4 is a schematic diagram showing the structure of the planar separator made of an insulating material.

A carbon allotrope composite field effect artificial aurora generating device includes the extremely low frequency power supply cabinet (1), the carbon allotrope composite field effect device (2) and the cuboid-shaped water tank (3).

The carbon allotrope composite field effect device (2) is formed by alternately and in parallel superimposing, in a form of parallel capacitors, a plurality of planar electrode plates (4) made of a foamed nickel deposited with a carbon allotrope composite and a plurality of planar separators (5) made of an insulating material. The planar electrode plate (4) made of the foamed nickel deposited with the carbon allotrope composite is prepared by the method of the normal-temperature, vacuum and high-frequency plasma chemical vapor deposition on the diamond-like carbon film as follows: a foamed nickel with a thickness of about 0.5 cm is taken as a bias cathode substrate, and a carbon allotrope composite with a thickness of about 200 nm is deposited on the surface of the foamed nickel by controlling the chemical vapor deposition formation conditions, so as to obtain the planar electrode plate (4). The foamed nickel deposited with the carbon allotrope composite has a high specific surface area, and the tip of the surface micro-region of the foamed nickel can cause vortex motion, which is conducive to produce a certain number of superluminal abnormal high-energy charged particles. The planar electrode plates (4) made of the foamed nickel deposited with the carbon allotrope composite are alternately and in parallel superimposed in a form of parallel capacitors and are separated from each other by the plane partition plate (5) made of a plastic plate with a thickness of about 0.5 cm, which can avoid short circuit caused by the contact occurred between the planar electrode plates (4) made of the foamed nickel deposited with the carbon allotrope composite. One output wire (6) of the extremely low frequency power supply cabinet (1) is connected to odd-numbered planar electrode plates (4) made of the foamed nickel deposited with the carbon allotrope composite through the conductive rod (7), and the other output wire (8) of the extremely low frequency power supply cabinet (1) is connected to even-numbered planar electrode plates (4) made of the foamed nickel deposited with the carbon allotrope composite through the conductive rod (9), so that a plurality of planar electrode plates (4) made of the foamed nickel deposited with the carbon allotrope composite are alternately and in parallel superimposed and construct a form of parallel capacitors. The carbon allotrope composite field effect device (2) is fixed in the cuboid-shaped water tank (3) fully filled with water, so that the carbon allotrope composite field effect can be enhanced by atomic hydrogen and atomic oxygen produced from water ionization.

When the extremely low frequency power supply cabinet (1) outputs an extremely low frequency electromagnetic wave with a power of 5-100 W and a frequency of 0-300 Hz, the carbon allotrope composite field effect artificial aurora generating device is in an optimized operation state, and thus the carbon allotrope composite field effect device (2) is stimulated to produce Schumann resonance and emit high-energy charged particles to excite the aurora.

In the period of dawn or dusk when solar rays are nearly parallel to the horizon, the high-resolution camera can be used to record the aurora that is produced in the non-earth magnetic pole region and excited by the carbon allotrope composite field effect artificial aurora generating device. The dynamic information including the occurrence time, position and hue of the columnar greenish aurora composed of oxygen ions and the occurrence time, position and hue of the columnar fuchsia aurora composed of nitrogen ions is helpful to study and explore the formation and distribution characteristics of the non-dipole spatial magnetic poles in the earth's atmosphere magnetosphere and the effects of cosmic energy on the earth's climatic environment. In addition, the carbon allotrope composite field effect artificial aurora generating device can also be used as a meteorological means for controlling climate change and environmental pollution and predicting natural disasters.

What is claimed is:

1. A carbon allotrope composite field effect artificial aurora generating device, comprising an extremely low frequency power supply cabinet, a carbon allotrope composite field effect and a cuboid-shaped water tank, wherein, the carbon allotrope composite field effect device is formed by alternately and in parallel superimposing, in a form of parallel capacitors, a plurality of planar electrode plates and a plurality of planar separators; each of the plurality of planar electrode plates is made of a foamed nickel deposited with a carbon allotrope composite, and each of the plurality of planar separators is made of an insulating material; a first output wire of the extremely low frequency power supply cabinet is connected to odd-numbered planar electrode plates of the plurality of planar electrode plates through a first conductive rod, and a second output wire of the extremely low frequency power supply cabinet is connected to even-numbered planar electrode of the plurality of planar electrode plates through a second conductive rod; and the carbon allotrope composite field effect device is fixed in the cuboid-shaped water tank fully filled with water.

\* \* \* \* \*